(12) United States Patent
Masaki et al.

(10) Patent No.: US 6,633,523 B1
(45) Date of Patent: Oct. 14, 2003

(54) OPTICAL MEMORY APPARATUS AND FOCUS SERVO CONTROL METHOD

(75) Inventors: Takashi Masaki, Kawasaki (JP); Toru Ikeda, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 0 days.

(21) Appl. No.: 09/542,396

(22) Filed: Apr. 4, 2000

(30) Foreign Application Priority Data

Apr. 8, 1999 (JP) .......................................... 11-101001

(51) Int. Cl.[7] .................................................. G11B 7/00
(52) U.S. Cl. .................................. 369/44.32; 369/44.11
(58) Field of Search ........................... 369/44.27, 44.25, 369/44.11, 44.35, 44.13, 44.14, 44.32, 44.29

(56) References Cited

U.S. PATENT DOCUMENTS 5,164,932 A * 11/1992 Fennema et al. ......... 369/44.29
5,438,557 A * 8/1995 Ito et al. .................. 369/44.32
5,642,340 A * 6/1997 Nomura .................... 369/44.25
5,751,674 A * 5/1998 Bradshaw et al. ........ 369/44.35
5,828,636 A * 10/1998 Matsumoto et al. ...... 369/44.27
5,978,331 A * 11/1999 Ceshkovsky .............. 369/44.29
6,160,773 A * 12/2000 Maegawa et al. ......... 369/44.34

FOREIGN PATENT DOCUMENTS

| JP | 2061829 | 3/1990 |
| JP | 6119648 | 4/1994 |
| JP | 6243488 | 9/1994 |
| JP | 7014179 | 1/1995 |

* cited by examiner

Primary Examiner—Richemond Dorvil
Assistant Examiner—Jason Olson
(74) Attorney, Agent, or Firm—Greer, Burns & Crain, Ltd.

(57) ABSTRACT

An optical memory apparatus has an offset inserting unit for inserting a predetermined offset to the focus error signal, and a focus servo pull-in determining unit for inserting, when the focus servo control unit executes focus servo pull-in, offset to the focus error signal, detecting level change of the focus error signal and determining success or failure of focus servo pull-in.

32 Claims, 8 Drawing Sheets

OPTICAL MEMORY APPARATUS AND FOCUS SERVO CONTROL METHOD

The present invention relates to an optical memory apparatus to conduct various processes in the recording and reproduction of information using a laser beam. This invention further relates to the manufacturing process of optical memory devices and their focus servo control method.

BACKGROUND OF THE INVENTION

As an optical memory medium, a magneto-optical recording medium represented by a magneto-optical disk has been proposed. A magneto-optical disk has a substrate and a recording layer consisting of magnetic material formed on the substrate. Information can be recorded by heating an optical beam and changing a magnetic field. On the occasion of reproducing information from the magneto-optical disk, the magneto-optical effect is utilized.

In this magneto-optical disk, data tracks for recording/reproducing data are provided. In general, a spiral groove (tracking guide groove) is provided on the substrate of the medium and parts called "lands" sandwiched between adjacent grooves are formed as the data recording and reproducing tracks.

As explained above, in order to record/reproduce information to/from the recording surface of the recording medium, a laser diode (LD) beam is condensed to the recording surface through an objective lens. This condensing condition must be maintained to always keep a "just focusing" condition. This control is called the focus servo. The process of obtaining the focus servo condition from the non-focus servo condition, namely a series of operations performed for focus servo pull-in, is called "focus entry."

Moreover, in order to record the data to the data track (land) explained above and reproduce such data, the LD beam in the just focusing condition has to follow the data track. This tracking control is called the "track servo."

FES (focus error signal) and TES (track error signal) can be obtained by applying the reflected beam of the LD from the medium surface to a detector for servo, and then processing the signal from the detector. The FES indicates the focusing condition on the medium surface of the LD beam. Namely, deviation between the medium surface and the focal point is indicated as a voltage.

However, if deviation of the focal point to the medium surface is large, FES is approximated to the voltage of the servo center. Behavior of this FES is called "Character S of FES".

For example, when the objective lens is moved to a considerably far position from a position considerably nearer to the medium, the FES voltage is displaced to a single side from the area near the servo center voltage. It is suddenly approximated to the servo center voltage from a certain level and it passes such voltage and is displaced to the opposite side. It is then displaced again to the servo center side for approximation.

Moreover, when the LD beam crosses the data track while focus servo is effectuated, TES changes like a sine wave conforming to such crossing. One period of the sine wave of the TES corresponds to the movement of the LD beam as much as one data track. In the ordinary recording and reproducing condition, the LD beam follows the data track. Namely, since the track servo is engaged, TES shows the voltage near the servo center.

When the medium is rotated under the condition that the LD beam is always in the just focusing condition on the medium surface, namely the track servo is searching when the focus servo is engaged, the LD beam crosses the data track due to eccentricity of the medium and the sine wave TES can be observed. Here, eccentricity of the medium causes deviation between the rotation center of the spindle motor and the spiral (circular) virtual center of the spiral data track on the medium. Due to this eccentricity, when the medium is rotated, the beam reflected from a fixed LD beam behaves as if the data track were moved in the radial direction of the medium.

TES reveals the LD beam crossing the data tracks. As explained above, when the focus servo is engaged but the track servo is searching across the data tracks of the medium, TES changes like a distorted sine wave due to the existence of eccentricity. However, since the sine wave of TES is generated because the LD beam crosses the data tracks, if the data track (land group) does not exist on the medium, such sine wave does not appear. Usually, the inner most circumference and outer most circumference have an annular area where the data track (land group) does not exist. This area is called the "mirror surface" area.

Here, when focus entry is performed, the objective lens is moved upward and downward and thereby the just focusing condition (on the recording surface on the medium) is attained at the point where the FES crosses the voltage at the servo center. Therefore, the focus servo can be effectuated by closing the control loop of the focus servo.

When focus entry is conducted, namely when the control loop of the focus servo is closed, it is impossible to continuously effectuate the focus servo due to axial deviation of the medium as it rotates, and unstable elements such as moving velocity of the objective lens cause the focus servo condition to be lost in some cases.

Focus servo maintains the focusing of the LD beam on the surface of the medium. Since the focal distance of the objective lens is fixed, the relative distance between the medium surface and objective lens may be kept constant by this control. When axial deviation of the medium is large and the moving speed of the objective lens is also large, though, change in the relative distance between the medium surface and objective lens becomes large, and it becomes a factor in failure of focus pull-in.

Therefore, since the focus servo is not always effective in the stable condition after focus entry (when the focus servo loop is closed), a determination is required to check whether stable focus servo is effective. If it is determined that stable focus servo is not effective, focus entry is conducted again, namely retry is conducted.

In order to judge whether normal focus entry has been conducted or not in known systems, namely whether stable focus servo is effective or not, the following has generally been specified:

1. FES shall not exceed a certain level, namely the FES level shall be located near the voltage of the servo center.
2. TES shall be changed at a certain amplitude (behavior of the sine wave).
3. LPOS (lens position signal) shall not exceed a certain level.

In item 2 above, in order to vary TES within a certain amplitude when focus servo is effective, the LD beam must be located at the groove (guide groove for effectuating track servo) on the medium surface.

In item 3, a mechanism for generating LPOS to be used for testing is necessary. LPOS will be explained below.

In these years, a movable optical system (head) for holding an objective lens as explained above has a mechanism called a carriage. A two-dimensional actuator mounted on the mechanism is moved in the radial direction with a VCM (Voice Coil Motor).

The two-dimensional actuator is formed of a focus actuator for controlling the objective lens in the focus direction with the focus coil, namely the focal position of the LD beam in the focus direction, and a track actuator for controlling the objective lens (or LD beam) in the track direction with the track coil. LPOS indicates the amount of displacement of the track actuator in the carriage, namely the objective lens.

In order to realize high speed seek by reducing the weight of the movable optical system, and to realize low cost by reducing the number of parts, the focus actuator, in the carriage consisting of only VCM (or track actuator) and an actuator of so-called single shaft type are employed in some cases.

In single shaft type actuators, the track actuator of the older art type is not present. LPOS is a signal indicating displacement of the carriage of the track actuator of the related art type. In the case of the single shaft type actuator, LPOS does not exist because the track actuator of the other type does not exist. Therefore, it is impossible to check success of focus entry by utilizing the LPOS of item 3 above.

Moreover, even in the apparatus using the two-dimensional actuator, LPOS indicates displacement of track direction (radius direction) of the objective lens (track actuator) in the carriage. When the objective lens (track actuator) does not track correctly in the track direction (radius direction) when the focus entry fails, such failure to track can be detected and it may be used as a factor for judging failure of focus entry. However, a failure to track correctly cannot be used to definitively determine that focus entry has failed. Therefore, use of the LPOS for judging success of focus entry is helpful, but it is only an assisting means.

When the LD beam (or actuator or objective lens) is located in the area where the grooves exist, the TES has the behavior indicated by the sine wave when the focus servo is successfully engaged. In this manner, TES can be used to judge that normal focus servo has occurred. However, when the LD beam is located at the mirror surface area (where grooves do not exist) of the internal circumference of the medium, the TES shows a flat waveform even when the focus servo is pulled in.

When the LD beam is located at the mirror surface area at the internal circumference of the medium, it is difficult to determine whether focus servo is effective or not. Therefore, when the TES is used for judgment of the success of focus entry, the LD beam (actuator, objective lens) must be located at a radial position where grooves exist. However, the sensor for checking the positioning of the LD beam (actuator) to locate it to the part where the grooves of the medium exist is not mounted in some cases for the purpose of cost reduction. In such mechanisms, the LD beam (actuator) cannot be accurately located to the part where the groove exists and focus entry must be realized in the area where the groove does not exist. In this case, judgment for success of focus entry using TES of the item 1 above can no longer be used.

Moreover, when the medium is loaded (fixed) to the spindle motor at the area near the center of the medium, the medium does not provide a perfect plane. Since the medium is rotated at a constant speed, the line velocity in the tangent direction due to rotation of the medium becomes larger at the external circumference, and the axial deviation generated due to medium formation error or the like becomes larger in the external circumference area of the medium.

It is apparent that the success rate of focus entry can be improved when this disturbance element during focus entry is reduced. Since axial deviation of the medium results in variation of the relative distance between the medium surface and the objective lens, the success rate of focus entry becomes higher when it is performed at the internal circumference side due to less axial deviation of the medium in comparison with the case where focus entry is conducted at the intermediate and external circumference sides.

For the reasons explained above, it is preferable that focus entry be conducted at the area near the rotation center of the recording medium at the inner most circumference, but such inner most circumference area of the medium is located further towards the center than the data track used as the control track and user track, and it is not specified by the ISO standard or the like. Accordingly, grooves basically do not exist in such area and check of successful focus entry using TES becomes impossible, although a groove is formed in some cases to record the serial number, depending on the medium manufacturer.

Figure 2A:
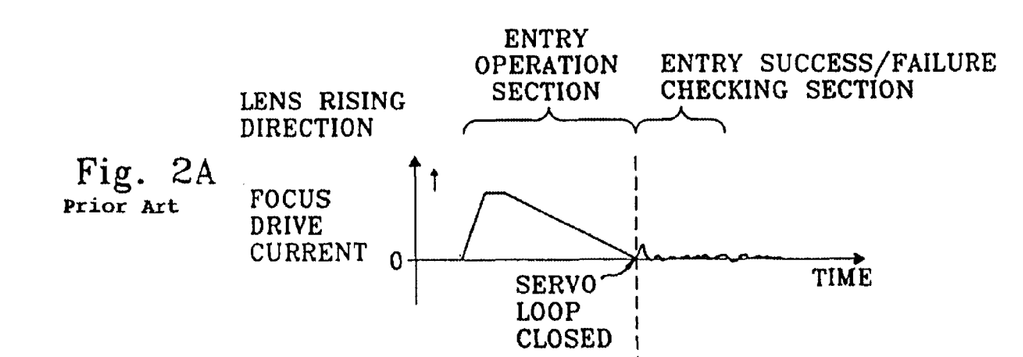
FIGS. 2(A), 2(B) and 2(C) are diagrams for explaining examples of focus entry conducted at the mirror surface of a medium.
Figure 2B:
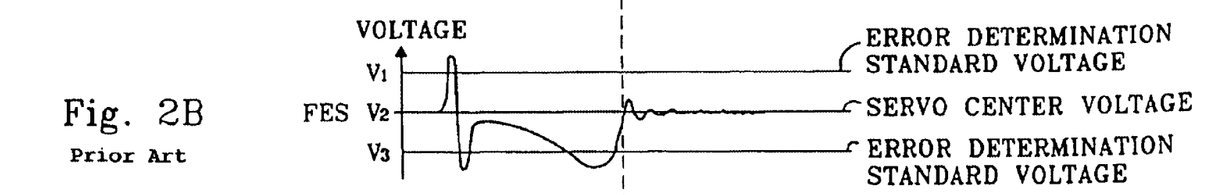
Figure 2C:
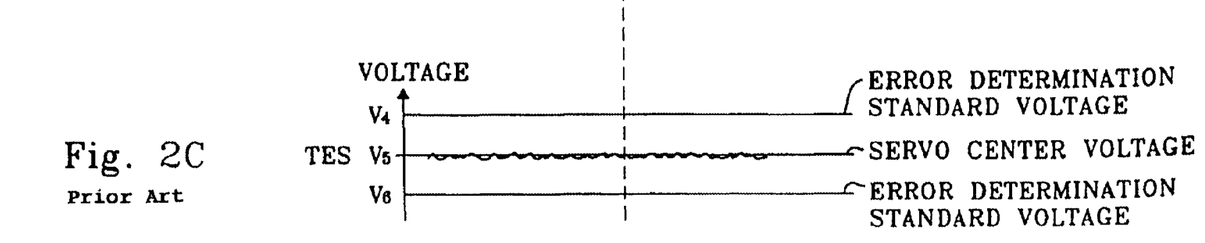

FIGS. 2(A), 2(B), and 2(C) illustrate examples of focus entry at the mirror surface area of the medium where the groove does not exist. FIG. 2(A) shows a focus drive current. First a current flows which lifts the lens and then the current changes to gradually lower the lens. The current is gradually converged to 0 when the servo loop closes.

FIG. 2(B) indicates behavior of FES to recognize whether an error is generated by examining servo center voltage V2, and error determination reference voltages V1, V3, or whether pull-in is successfully generated. FIG. 2(C) indicates behavior of TES to recognize whether it is located at the track center by examining the servo center voltage V5, and error determination reference voltages V4, V6, and whether or not it has crossed the track.

When FES crosses the servo center voltage V2, and the focus servo loop is closed to make the focus servo effective, the LD beam is located at the mirror surface area of the medium. Since the groove does not exist here, TES does not show the behavior of the sine wave.

Here, when success is judged using the amplitude of the TES, TES does not exceed V4 or become lower than V6 even when success is detected. Accordingly, focus entry is considered as a failure.

As explained above, when TES and LPOS cannot be used and only behavior of FES can be used to judge success of the operation at the time of focus entry, the checking operation has a lower accuracy in comparison with the checking operation in the related art. Thus, there is a need for focus servo control methods which can judge the success of focus entry with using TES and LPOS.

OBJECTS OF THE INVENTION

Therefore, it is an object of the present invention to more accurately check for success and failure of focus pull-in even when only FES can be used for checking and checking is performed at the area where the groove is not formed.

SUMMARY OF THE INVENTION

An optical memory apparatus for conducting focus servo control to maintain a constant relative positional relationship between a memory medium and an optical spot has a focus actuator for moving the optical spot relative to the memory medium. The apparatus also includes a driving unit for driving the focus actuator, a focus detecting unit for detecting the focus error signal indicating the relative positional relationship between the memory medium and optical spot, and a focus servo control unit for driving the driving unit based on the focus error signal detected by the focus detecting unit to move the focus actuator. An offset inserting unit is provided for inserting a predetermined offset to the focus error signal, and a focus servo pull-in determining unit inserts the offset to the focus error signal when the focus servo control unit performs the focus servo pull-in. The focus servo pull-in determining unit determines success or failure of focus servo pull-in by detecting level changes of the focus error signal during such insertion of offset. The focus servo pull-in determining unit removes the offset element inserted after the determination.

In addition, the focus servo pull-in determining unit detects level changes of the focus error signal by comparing an integral value of the focus error signal before insertion of offset after pull-in of the focus servo and an integral value of focus error signal after insertion of offset.

The focus servo pull-in determining unit detects level changes of the focus error signal by comparing the center value of the positive and negative maximum values obtained by sampling the focus error signal a plurality of times before insertion of offset after pull-in of focus servo, and the center value of the positive and negative maximum values obtained by sampling the focus error signal a plurality of times after insertion of offset.

Moreover, the focus servo pull-in determining unit can detect level changes of the focus error signal by comparing the level of focus error signal after it passes through a low-pass filter before insertion of offset after focus servo pull-in with the level of focus error signal after insertion of offset.

Moreover, the focus servo pull-in determining unit can detect that the result of adding the level of focus error signal after insertion of offset to the inserted offset value is zero.

It is also a characteristic of the present invention that offset is given by step by step addition or subtraction. The amount of addition can be reduced each time the number of times of retry of focus servo pull-in increases, and the waiting time after additional insertion of offset can be set longer for each increase in the number of times of retry of focus servo pull-in.

It is also a characteristic that offset is inserted in any one of the positive or negative sides during insertion of offset in order to determine success, and then offset is further inserted in the opposite polarity to make a second check. Moreover, the focus servo control method for maintaining constant relative positional relationship between the detecting body and optical spot includes the steps of detecting focus error signal indicating the relative positional relationship between the detecting body and optical spot, inserting the predetermined offset to the focus error signal and determining success or failure of focus servo pull-in by inserting offset to the focus error signal when the focus servo pull-in is conducted, and then detecting level changes of the focus error signal at the inserting time.

BRIEF DESCRIPTION OF THE DRAWINGS

The above and other objects, features, and advantages of the present invention will become more apparent from following detailed description with reference to the drawings.

DETAILED DESCRIPTION OF THE PREFERRED EMBODIMENTS

Figure 3A:
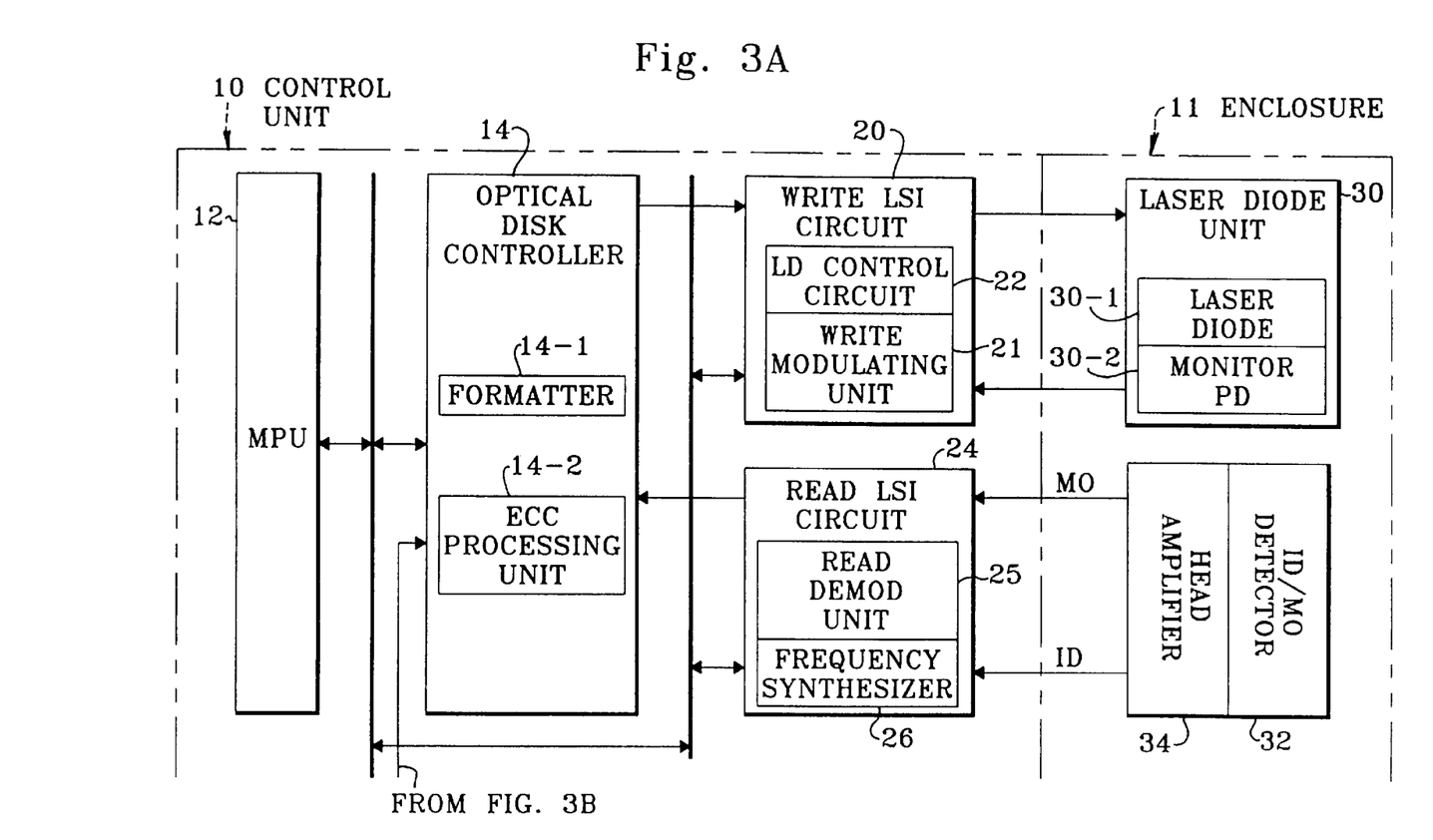
FIGS. 3(a) and 3(B) are a block diagram illustrating a schematic structure of an embodiment of a memory apparatus of the present invention.
Figure 3B:
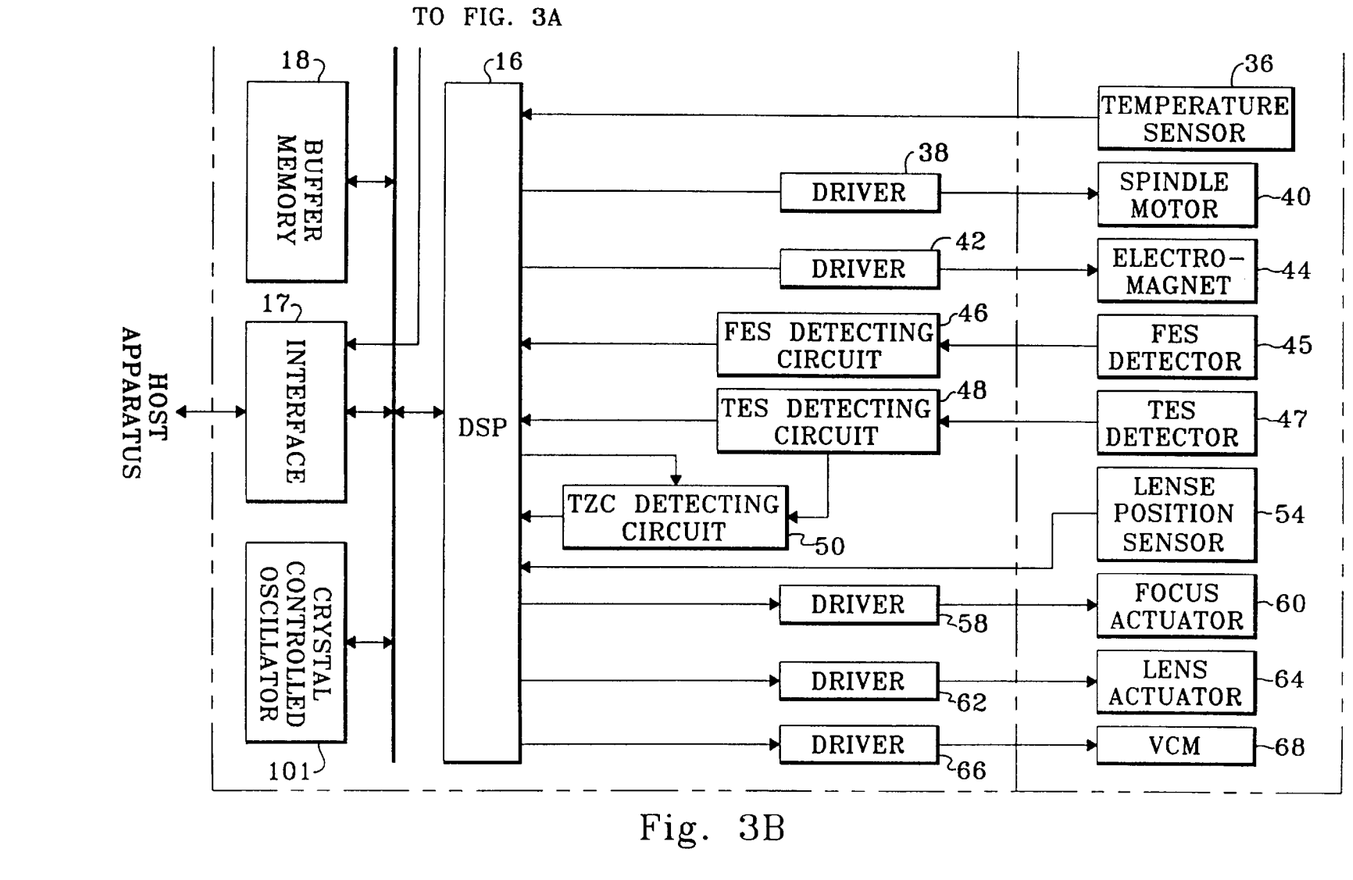

First, an embodiment of the memory apparatus of the present invention will be explained. FIGS. 3(A) and 3(B) are a block diagram illustrating the schematic structure of an embodiment of the memory apparatus. In this embodiment, the present invention is applied to an optical disk apparatus. This optical disk apparatus is capable of incorporating each embodiment of the focus entry success checking method of the present invention.

As illustrated in FIGS. 3(A) and 3(B), an optical disk drive (ODD) is roughly composed of a control unit 10 and an enclosure 11. The control unit 10 has an MPU 12 for totally controlling the optical disk apparatus, an interface 17 for exchanging commands and data with the host apparatus (not illustrated), an optical disk controller (ODC) 14 for executing the processes required for data read/write to/from the optical disk (not illustrated), a digital signal processor (DSP) 16 and a buffer memory 18.

The buffer memory 18 is used in common with MPU 12, ODC 14 and to interface 17 and includes, for example, a dynamic random access memory (DRAM). A crystal-controlled oscillator 101 used to generate clock signals is connected with MPU 12.

The ODC 14 is provided with a formatter 14-1 and an error correction code (ECC) processing unit 14-2. During write access, the formatter 14-1 generates the recording format by dividing, in sectors of the optical disk, the NRZ write data, and the ECC processing unit 14-2 generates and adds ECC in units of sector write data, and also generates and adds the cyclic redundancy check (CRC) code as required.

Moreover, the ECC processing unit 14-2 converts the ECC encoded sector data, for example, to 1-7 Runlength limited (RLL) code.

During read access, inverse conversion of 1-7RLL is performed to the sector data and next, after CRC is performed by the ECC processing unit 14-2, error detection and error correction by ECC are conducted.

Moreover, the formatter 14-1 couples the NRZ data in units of sectors and then transfers such NRZ data to the host apparatus as the stream of NRZ read data.

A write large scale integrated circuit (LSI) 20 is provided for ODC 14. The write LSI 20 includes a write modulation unit 21 and a laser diode control circuit 22. Control output of the laser diode control circuit 22 is supplied to the laser diode unit 30 provided in the optical unit in the enclosure 11.

The laser diode unit 30 integrally includes a laser diode unit 30-1 and a monitor detector 30-2. The write modulation unit 21 converts the write data to the data format in pit position modulation (PPM) recording (called the mark recording) or pulse width modulation (PWM) recording (called edge recording).

As the optical disk for data recording/reproducing by using the laser diode unit 30, namely as the programmable magneto-optical (MO) cartridge medium, any one of 128 MB, 230 MB, 540 MB, 640 MB and 1.3 GB can be used. In the MO cartridge medium of 128 MB, PPM recording to record data corresponding to the existence or non-existence of the mark on the optical disk is employed. Moreover, as the optical disk recording format, constant angular velocity (CAV) is employed for the optical disk of 128 MB, zone constant angular velocity (ZCAV) for the optical disk of 230 MB, and the number of zones of user area is one zone for the optical disk of 128 MB and 10 zones for the optical disk of 230 MB.

In regard to the MO cartridge medium of 540 MB and 640 MB for high density recording, PWM recording is employed in which track edges, namely, the front edge and rear edge, are caused to correspond to the data for the purpose of recording. Here, the difference in storing capacity in the optical disk of 540 MB and optical disk of 640 MB depends on the difference of sector capacity. When the sector capacity is 2048 bytes, the optical disk of 640 MB is used. When the sector capacity is 512 bytes, the optical disk of 540 MB is used.

The recording format of the optical disk is zone CAV. The number of zones in the user area is 11 zones in the optical disk of 640 MB, and 18 zones in the optical disk of 540 MB.

As explained above, this embodiment can be applied to the optical disk of 128 MB, 230 MB, 540 MB, 640 MB and 1.3 GB and moreover to the optical disk of 230 MB, 540 MB, 640 MB and 1.3 GB covering the direct overwrite. When an optical disk is loaded to the optical disk apparatus, the identification (ID) area of the optical disk is read first and a class of optical disk is recognized by MPU 12 from the pit interval. Thereby, recognition result of identification is notified to ODC 14.

As the read system for ODC 14, a read LSI 24 is provided. The read LSI 24 has a read demodulating unit 25 and a frequency synthesizer 26. To the read LSI 24, a receiving signal as the returning beam of laser (LD) from the laser diode 30-1 by the ID/MO detector 32 provided in the enclosure 11 is input as the ID signal and MO signal via the head amplifier 34.

The read demodulating unit 25 of the read LSI 24 is provided with an automatic gain control (AGC) circuit and other circuits such as a filter, a sector mark detecting circuit or the like. The read demodulating circuit 25 generates the read clock and read data from the input ID signal and MO signal to demodulate the PPM data or PWM data to original NRZ data.

Moreover, since the zone CAV is employed, the frequency dividing ratio setting control is performed to generate the clock frequency corresponding to the zone for the frequency synthesizer 26 in the read LSI 24 from the MPU 12.

The frequency synthesizer 26 is a phase locked loop (PLL) circuit having a programmable frequency divider and generates the reference clock having the intrinsic frequency predetermined, depending on the zone position on the optical disk. The reference clock is used as the read clock.

Namely, the frequency synthesizer 26 is formed of a PLL circuit having the programmable frequency divider, and MPU 12 generates, based on fo=(m/n)fi, the reference clock of the frequency conforming to the frequency dividing ratio m/n, which is set depending on the zone number.

Here, the frequency dividing value n of the frequency dividing ratio m/n is the intrinsic value depending on the type of optical disk of 128 MB, 230 MB, 540 MB, 640 MB or 1.3 GB. In addition, the frequency dividing value m of the frequency dividing ratio m/n changes depending on the zone position of the optical disk, and this value is prepared as table information corresponding to the zone number for each optical disk. Moreover, the frequency of the reference clock is generated outside of the frequency synthesizer 26.

The read data demodulated by the read LSI 24 is supplied to the read system of ODC 14. This signal is subjected to the CRC and ECC processes by the encoding function of the ECC processing unit 14-2 after the inverse conversion of 1-7RLL and is recovered to the NRZ sector data.

Next, the formatter 14-1 converts the data to the NRZ read data stream coupling the NRZ sector data and then transfers the data to the host apparatus from the interface 17 via the buffer memory 18.

To the MPU 12, a detected signal of the temperature sensor 36 is provided in the enclosure 11 via DSP 16. MPU 12 controls the light emitting powers for read, write and erase operations in the laser diode control circuit 22 based on environment temperature in the optical disk apparatus detected by the temperature sensor 36.

MPU 12 controls a spindle motor 40 provided in the enclosure 11 via DSP 16 with a driver 38. In this embodiment, since the recording format of the optical disk is the zone CAV, the spindle motor 40 is rotated, for example, at a constant speed of 3000 rpm.

Moreover, MPU 12 controls an electromagnet 44 provided in the enclosure 11 via a driver 42 via DSP 16. The electromagnet 44 is located in the opposite side of the LD beam radiating side of the optical disk loaded in the optical disk apparatus, and an external field is supplied to the optical disk at the time of recording and erasing operations.

DSP 16 is provided with a servo function for positioning of the LD beam emitted from the laser diode 30 for the optical disk. This servo function operates as the seek control unit and on-track control unit for getting into the on-track condition by seeking the target track. The seek control and on-track control can be executed simultaneously in parallel to the write access and read access to the host command by MPU 12.

In order to realize the servo function of DSP 16, a detector 45 for focus error signal (FES) to receive the returning LD beam from the optical disk is provided in the optical unit in the enclosure 11. The FES detecting circuit 46 generates FES from the receiving output of the FES detector 45 and then inputs it to DSP 16. An optical unit in the enclosure 11 is also provided with a detector 47 for the tracking error signal (TES) to receive the returning LD beam from the optical disk.

The TES detecting circuit 48 generates TES from the receiving output of the TES detector 47 and then inputs it to DSP16. TES is also input to the track zero-cross (TZC) detecting circuit 50. Thereby, the TZC pulse is generated and it is then input to DSP 16.

In the enclosure 11, a lens position sensor 54 is provided to detect the position of the objective lens for radiating the laser (LD) beam to the optical disk. The lens position detecting signal (LPOS) from the lens position sensor 54 is then input to DSP 16.

DSP 16 controls and drives, in order to control the position of the LD beam spot on the optical disk, the focus actuator 60, lens (track) actuator 64 and voice coil motor (VCM) 68 via drivers 58, 62, 66.

Figure 4:
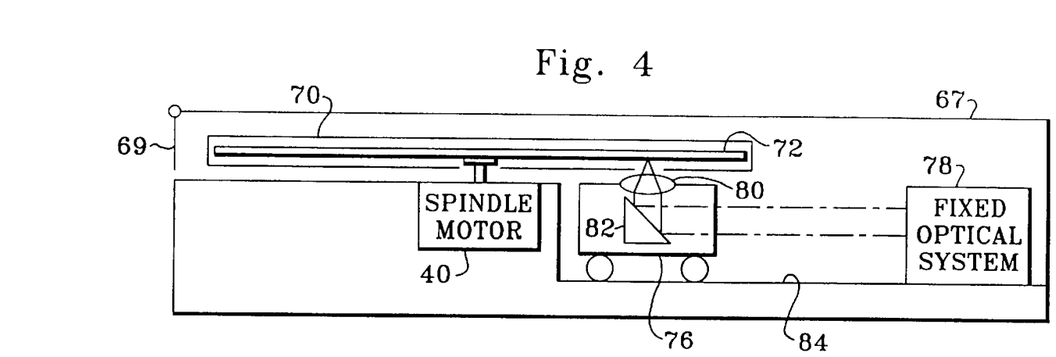
FIG. 4 is a cross-sectional view illustrating a schematic structure of an optical memory device.

FIG. 4 is a cross-sectional view illustrating a schematic structure of the enclosure 11. The spindle motor 40 is provided within the housing 67 and the optical disk (MO disk) 72 accommodated in the MO cartridge 70 is loaded to the hub of the rotating shaft of the spindle motor 70 by inserting the MO cartridge 70 from the side of the inlet door 69. In this manner, the optical disk 72 can be loaded to the optical disk apparatus.

At the lower side of the optical disk 72 in the loaded MO cartridge 70, a movable carriage 76 guided by a guide rail 84 is provided in a direction for crossing the tracks of the optical disk 72 under the control of the VCM 64. On the carriage 76, the objective lens 80 is loaded and the LD beam spot can be focused on the recording surface of the optical disk 72 when the LD beam is incident via the rising mirror 82 from the laser diode (30-1) provided in the fixed optical system 78.

The objective lens 80 is controlled to move in the optical axis direction by the focus actuator 60 of the enclosure 11 illustrated in FIG. 3. It can be moved by the lens (track) actuator 64, within the range of several tens of tracks, for example, in the radial direction crossing the tracks of the optical disk 72.

The position of the objective lens 80 loaded on the carriage 76 is detected by the lens position sensor 54 illustrated in FIG. 3B. The lens position sensor 54 makes the lens position detecting signal zero at the neutral position where the optical axis of the objective lens 80 is directed to the just upward direction, and outputs the lens position detecting signal depending on the amount of movement of different polarities for movement of the optical disk 72 in the outer side and inner side.

Figure 1:
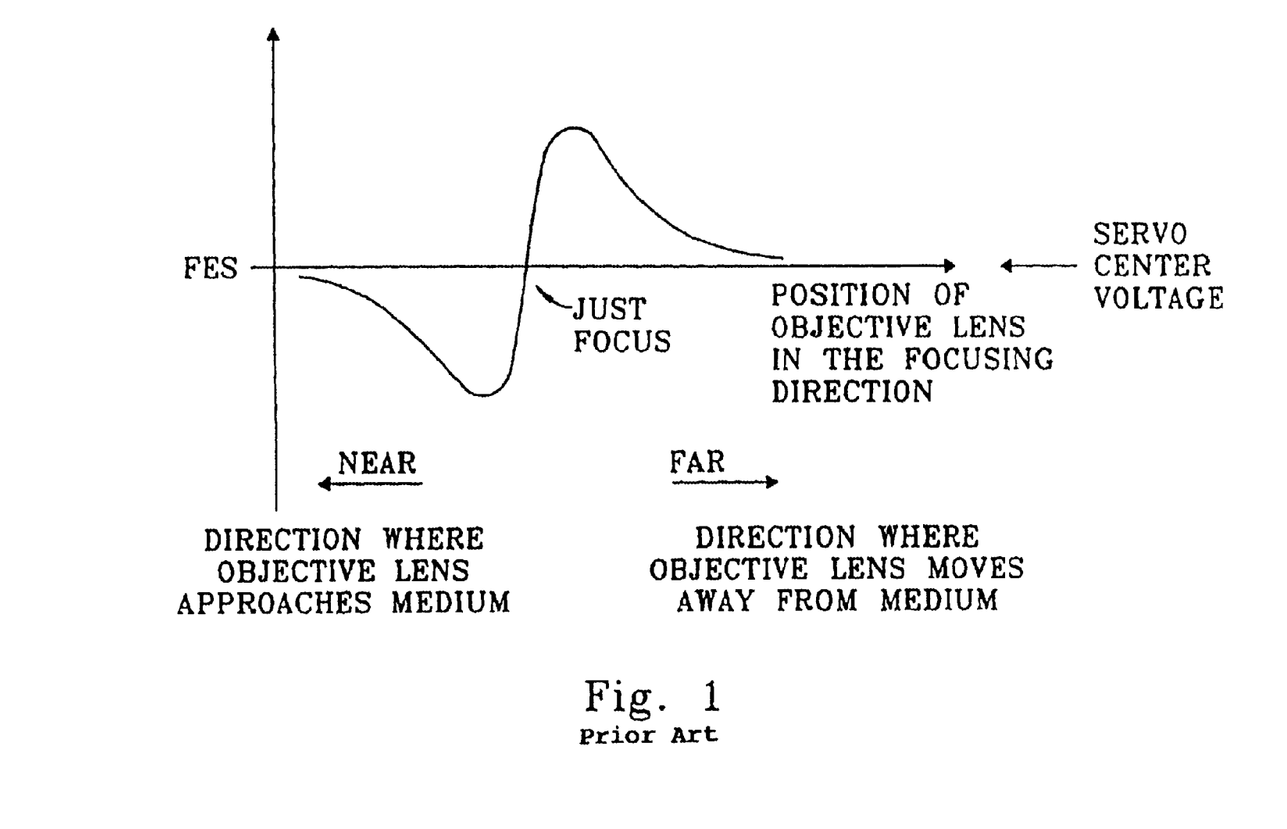
FIG. 1 is a diagram for explaining the relationship between focus direction position of an objective lens and FES ("S-character" of FES)

As illustrated in FIG. 1, in the example of the relationship between the focusing direction position of the objective lens and FES (called "S-character" of FES), FES changes as illustrated in this figure when the objective lens is moved in the focusing direction.

The point where FES at the center of FIG. 1 crosses the servo center voltage is the just focusing point. At the focus entry, the objective lens is moved in the focusing direction to monitor that FES crosses the servo center voltage, and the focus servo control loop is closed at this point in order to make effective the focus servo.

Figure 5:
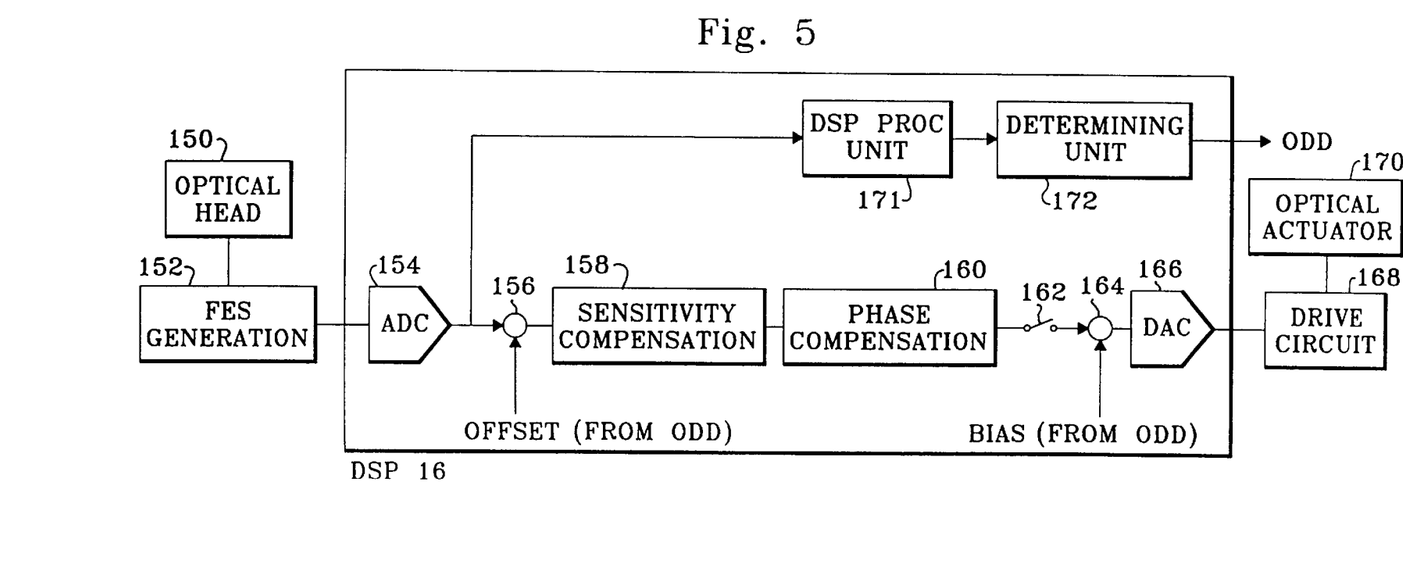
FIG. 5 is a block diagram for explaining focus servo.

FIG. 5 illustrates signal processing by DSP 16 of the focus servo system. The LD beam reflected by the medium surface and returned to the optical head 150 enters the detector for servo purposes.

An FES generating circuit 152 processes the signal from this detector to generate the FES. FES generated here is input to DSP 16 and is then converted to a to digital signal by an A/D converter 154. Thereafter, this digital signal passes the offset inserting unit 156 by the internal calculation of DSP 16. The offset inserted here is the offset produced for purposes of the present invention. Thereafter, sensitivity compensation 158 and phase compensation process 160 are conducted.

A subsequent switch 162 opens or closes the focus servo loop and controls here the ON-OFF states of the focus servo. Thereafter, the signal passes the bias inserting unit 164. Here, bias to be inserted on the instruction of ODD is part of the processing for moving the objective lens in the upward and downward direction, namely in the focusing direction.

When the amount of bias is changed, the objective lens can be moved in the focusing direction to change its position. Thereafter, the digital signal processed in various manners is converted to an analog signal via the D/A converter 166.

This analog signal enters a drive circuit 168 to apply current to the focus coil and a current signal output therefrom enters the focus coil of the optical actuator 170 to drive the focus actuator.

Figure 6A:
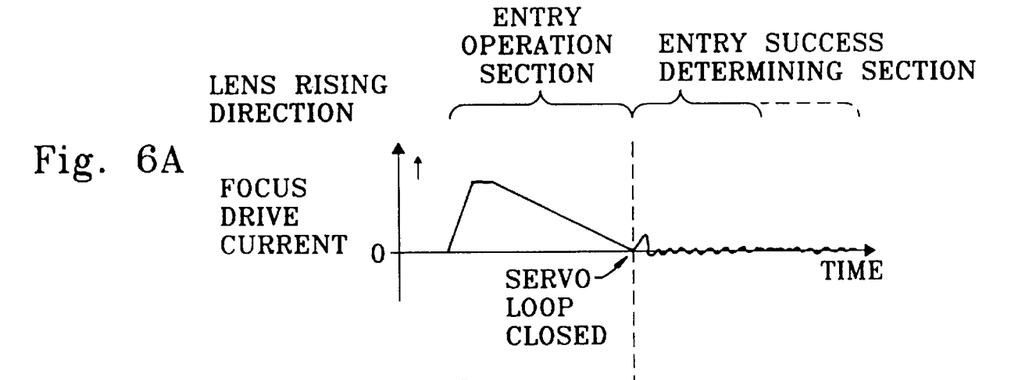
FIGS. 6(A), 6(B) and 6(C) are diagrams for explaining an embodiment of the present invention for determination of success of focus entry.
Figure 6B:
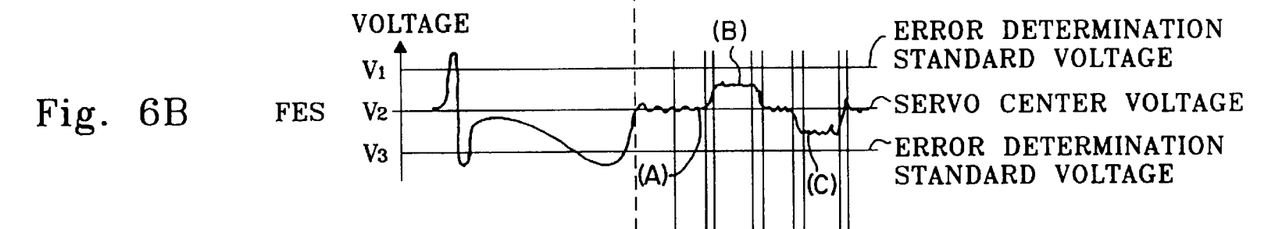
Figure 6C:
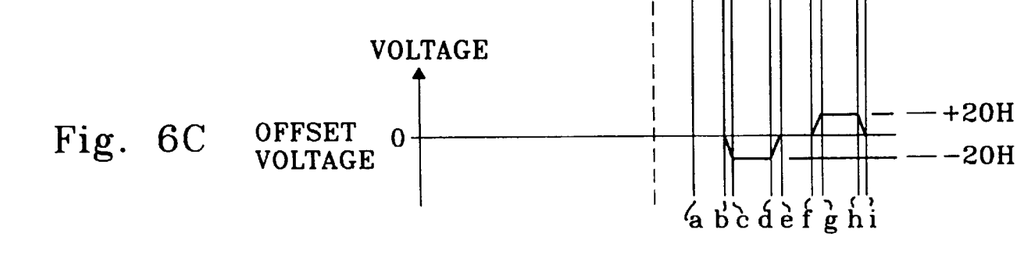

FIGS. 6(A), 6(B) and 6(C) illustrate an example of the focus entry success determination of the present invention. This determination may be done by ODD as the firmware function to drive the enclosure of MPU, ODC and DSP, or may be realized by providing the determining function to the DSP.

When FES crosses the servo center voltage V2, the focus servo loop is closed to effectuate focus servo. Here, the waiting condition continues for a constant period for stable servo. Thereafter, it is assumed that FES does not exceed the error determination standard.

Namely, it is assumed that FES does not exceed V1 or become lower than V3. In this case, DSP inserts offset and monitors FES to detect that FES changes depending on insertion of offset and determines success of focus entry. After determination, the offset inserted is removed to initialize the condition.

If the focus servo loop is closed, focus servo is effectuated and then a waiting condition is continued for a constant period for stable servo. Thereafter, FES does not exceed the error determination standard. Level (A) of FES is read under the condition that offset is not inserted in the section a-b illustrated.

Here, offset (−20H) is gradually inserted in the section b-c. In the section c-d, level(B) of varied FES is read. In the section d-e, the inserted offset is gradually set to zero and the section e-f is then considered. Usually, the levels (A) and (B) are compared in the processes up to this process to complete determination for success or failure of focus entry.

The successive sections indicate an example of insertion of offset inverted from that in the section c-d in order to improve accuracy of the determination of success or failure of focus entry. In section f-g, the inverse offset of +20H is inserted and the level (C) of FES is read in the section g-h.

The offset inserted in the section h-i is returned to zero. Here, the levels (A), (C) are compared for checking again for success or failure of focus entry. Behavior of FES when offset is inserted to the focus servo loop will be explained below.

When offset is inserted to the servo loop under the condition that focus servo is normally effective, the circulated FES changes in an amount proportional to such offset amount.

Focus servo is effective to control the focus actuator so that FES always becomes equal to the servo center voltage. When offset is inserted to FES at the input, control is conducted so that FES after addition of such offset becomes equal to the servo center voltage.

Namely, FES changes to cancel the amount of offset inserted. When servo is effective at an irregular servo point, the circulated FES almost does not change even when offset is inserted to the servo loop. This happens because the condition in which servo becomes effective at the irregular servo point is where the objective lens is located at the mechanically limited position and therefore if offset is inserted, the objective lens does not move and thereby FES also does not change.

When the focus servo is effective at the regular focus point, offset is inserted and thereby the objective lens moves. Accordingly, the circulated FES changes for only the amount proportional to such offset amount.

After confirming that FES does not change (off focus signal is not generated) for the level exceeding the predetermined level after focus entry using the phenomenon explained above, success of focus entry is determined by the following system.

Offset is added to the focus servo loop by the internal calculation of the DSP. The circulated FES is obtained by the A/D converter to calculate whether or not such voltage has changed for the expected voltage in comparison with the FES voltage before addition of offset. When variation of the FES level before and after insertion of offset is set to the expected value, success of focus entry is determined, assuring stable focus servo.

As explained above, when off-focus is not generated by checking such off-focus for a certain period, the DSP processing unit 171 accumulates or equalizes FES read by the A/D converter to obtain the FES level in the steady condition. Thereafter, to read FES by the A/D converter, a constant amount of offset is added by the internal calculation of DSP depending on the instruction of the ODD (Optical Disk Drive), including the function corresponding to the focus servo control unit to conduct focus servo control. Offset amount added in this case appears directly as a change of current applied to the focus coil, and the objective lens moves as much as such offset in the upper and lower focusing direction.

Since sudden change of offset becomes a factor resulting in unstable focus servo, the offset must be changed gradually to a certain degree. For example, when it is requested to change offset for −20H, it is not changed by −20H immediately. Namely it is changed first by −2H. After the constant period of time, it is changed by another −2H. These increments are repeated until −20H is obtained.

When offset of the desired amount is inserted to FES, a determining unit 172 (FIG. 5) of the DSP reads, as explained above, the FES level in the condition that offset is inserted. Here, the FES level before insertion of offset is compared with the FES level after insertion of offset and the difference can be calculated.

When the FES level difference obtained exceeds the expected amount, it can be determined that the focus servo loop is normally effective. Namely, the focus entry can be determined as successful. This is the second determination for successful focus entry.

After the confirmation, added offset can be discussed and returned to the condition before addition thereof. When the offset is returned, the objective lens physically moves and therefore it must be changed slowly as explained above.

For confirmation of success of focus entry, in the above example, offset is set to −20H. After this confirmation, offset is inversely set to +20H and it is checked again. Thereby, the offset in both directions may be checked and accuracy for determination of success of focus entry can be improved. This process is indicated by the section f-g-h-i of FIG. 5.

Figure 7A:
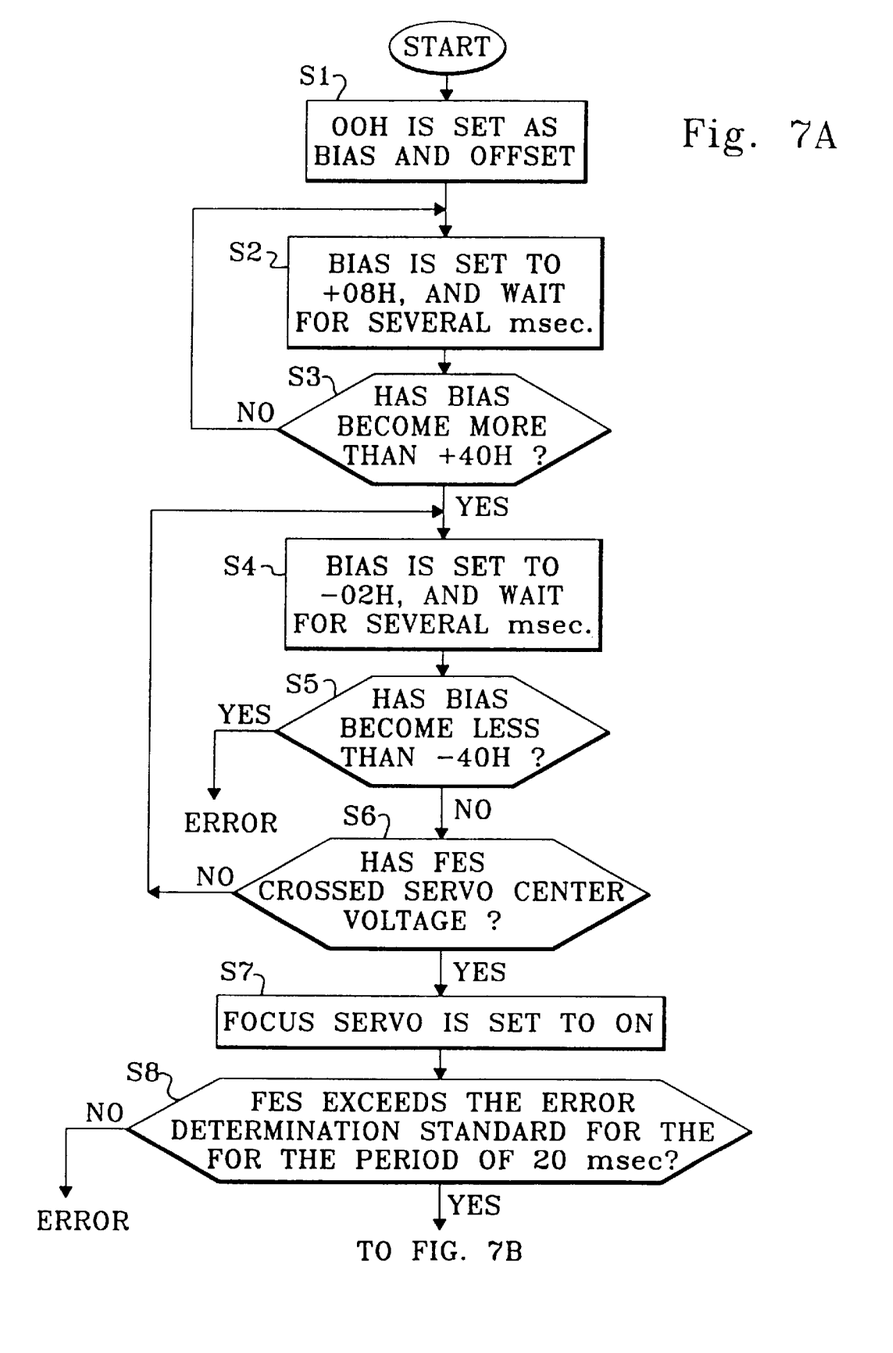
FIGS. 7(A) and 7(B) are a flowchart for explaining focus entry.
Figure 7B:
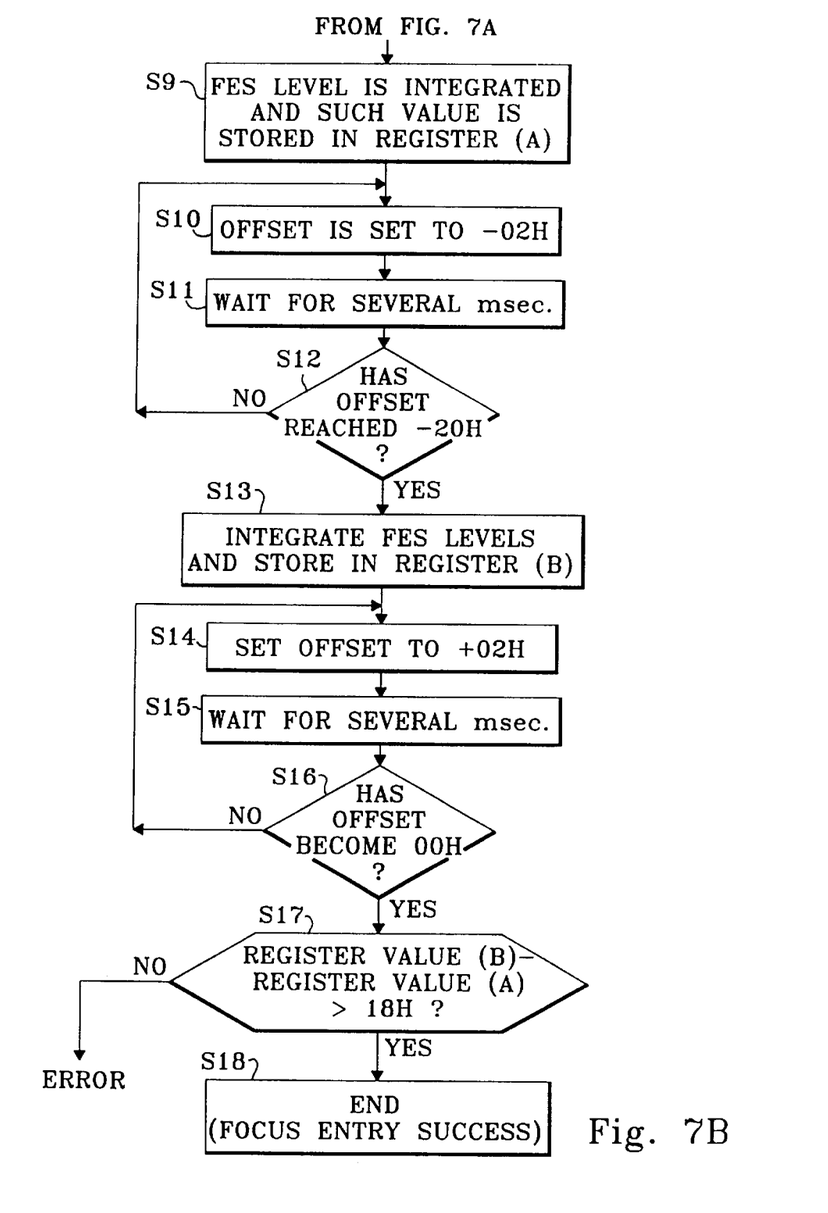

FIGS. 7A and 7B illustrate flowcharts at the time of focus entry. First, the initial value 00H is set as the bias and offset (S1).

Here, bias is set to +08H (S2) so that the objective lens moves upward and comes closer to the medium. With repetition of this process, the bias added becomes +40H and thereby the objective lens is moved upward to the position very near to the medium (S2, S3). The bias is then set to −02H and thereby the objective lens moves downward.

The reason why change of bias is set smaller than that explained above is that since FES changes suddenly for movement of the objective lens at the area near the just focusing point, the objective lens moves slowly to surely detect the point that FES crosses the servo center voltage (S4).

Next, it is determined that the objective lens moves downward to the lowest point after the offset is changed and the point where FES crosses the servo center voltage cannot be found (S5). Namely, since the bias is reduced and the just focus point cannot be found even when offset reaches −40H, failure of focus entry is determined.

Here, when bias becomes −40H and failure of focus entry is determined, an error process is executed. As explained above, the point where FES crosses the servo center voltage while FES is lowered is searched (S6).

This process is repeated (S4 to S6). When the point where FES crosses the servo center voltage is found, it indicates that the LD beam is in the just focusing condition and therefore the focus servo is set to the ON condition (S7).

The focus entry success determination process starts from this step. First, it is determined that FES does not exceed the error determination standard for the period of 20 msec. Here, it is determined that FES does not oscillate after focus pull-in (S8).

When FES oscillations exceed the error determination standard, the focus entry is determined to be failed. When failure of focus entry is determined, an error process is executed. Before offset is inserted after success of focus entry is determined by the first determination process, FES level is integrated and such value is stored in a register (A) (S9).

Here, the offset is gradually inserted in steps of −2H until it reaches −20H (S1 to S12). Under the condition that offset of −20H is inserted, FES level is integrated by the processing unit 171 (here, integration circuit) and such value is stored in a register (B) (S13). The offset inserted for determination is gradually recovered to the initial condition in the step of +2H (S14 to S16).

The determination unit 172 determines success of focus entry and normally completes the process (S18) when FES level before insertion of offset (register(A)) is subtracted from the FES level when offset is inserted (register(B)) and the difference of FES level is higher than 18H (a value a little smaller than the expected FES variation) (S17).

When the above difference is under 18H, since variation of FES is small in spite of insertion of offset, it is considered a failure of focus entry and the error process is executed.

In the steps S9, S13, an integral value of FES is used for measuring the level of FES. Here, the integrated value is used to measure the average value of FES levels, which may change a little due to anomalies. Therefore, the maximum value and minimum value can be obtained by sampling FES for several times in addition to the integrated value and thereby the intermediate value thereof can also be used.

Moreover, FES is sent to a low-pass filter in order to remove noise elements and an output value of the filter may also be used. Namely, the processing unit 171 to which FES is fed back may be structured by an integration circuit, an averaging circuit, low-pass filter or a composite for obtaining an average after the low-pass filter circuit.

When focus servo is effective and offset is changed, the objective lens actually moves and thereby the focus servo becomes a little unstable.

Therefore, at the time of retry of focus entry, change of offset may be set more slowly than during the first try of focus entry in order to alleviate the influence thereof. It is also possible that the time for inserting offset may be changed after the focus servo loop is closed. In other words, a changing rate may be eased by reducing the amount of change of offset in the steps S10, S14, or the waiting time may be set longer in the steps S11, S15. It is enough that the changing rate (velocity) of the unit time is changed by changing the rate of +2H in the unit time of DSP process to +1H, or setting longer the time required for changing 2H.

When offset is inserted, as illustrated in the block diagram of FIG. 5, immediately after FES is converted by the A/D converter and before compensation of sensitivity, the amount of offset inserted and the variation of FES generated by insertion of offset respectively have equal absolute values of the signs inverted with each other. Moreover, monitoring FES requires the calculation process for compensation after the sensitivity is compensated. This process is complicated enough to make high speed determination difficult. But, before sensitivity compensation, such calculation is effective and simplified.

Namely, when the inserted offset amount and variation of FES are added, the result becomes zero. In the above explanation, determination has been made depending on the variation of FES level before and after insertion of offset, but such determination can also be used. In this case, determination of S17 of FIG. 6-b may be set as the FES level which has been changed by offset, namely (Register($B$)−Register($A$))=−1×added offset (−20$H$).

In the condition determination in steps S5, S8 of FIG. 7A and in step S17 of FIG. 7B, "error" indicates the error process when the focus entry process is determined to be a failure. In this process, the process is in the off state when the focus servo is on and the inserted bias and offset are returned to 00H. Usually, the retry process is set and the process returns to S1.

Namely, when the ODD gets a determination for failure from the DSP 16, it enters the retry process and executes retries for several times, up to a predetermined number of times. When the ODD determines that focus entry was successful, it proceeds to the next process such as track pull-in.

Since the present invention does not monitor the S-character behaviors of FES and TES, which may easily be influenced by vibration of the objective lens or the like, and monitors behavior of offset using a signal element of offset which can surely be detected, success of focus entry can be quickly and stably checked.

The present invention can realize, for checking of success of focus entry, the method of checking the focus entry with higher accuracy in cooperation with the checking method utilizing FES, TES, LPOS of the related art. Namely, the present invention can be applied not only to the mirror surface of the memory medium such as the embodiment explained above, but also to the groove forming area.

In this embodiment, a magneto-optical disk is used for explanation, but the present invention can also be applied to the phase change type optical disk, DVD, CD, optical card/tape and magneto-optical card/tape or the like. In addition, various detecting bodies may also be introduced for focus entry.

According to the present invention explained above, determination of success/failure of focus servo pull-in may be made quickly with higher accuracy even when the LD beam is located to any one of the data tracks on the medium (groove forming area) or the mirror surface area. Moreover, focus entry can be made in the area near the rotation center of the memory medium, namely at the area which is not influenced as much by axial deviation. In addition, the process can be quickly shifted to the initial process (initialization) such as the next track pull-in by raising the success rate of the focus pull-in. Accordingly, the performance of the optical memory apparatus can be improved. Moreover, the present invention can be embodied easily only by alteration of the program in the apparatus without addition of new mechanism and circuit.

While the principles of the invention have been described above in connection with a specific apparatus and applications, it is to be understood that this description is made only by way of example and not as a limitation on the scope of the invention.

What is claimed is:

1. Optical memory apparatus for conducting focus servo control to maintain constant relative positional relationship between a memory medium and an optical spot, comprising:

a focus actuator for moving said optical spot relative to said memory medium;

a driving unit for driving said focus actuator;

a focus detecting unit for detecting a focus error signal indicating relative positional relationship between said memory medium and said optical spot;

a focus servo control unit for driving said driving unit based on the focus error signal detected from said focus detecting unit in order to move said focus actuator;

an offset inserting unit for inserting a predetermined offset to said focus error signal; and a focus servo pull-in determining unit for detecting level change of said focus error signal where said predetermined offset is inserted to said focus error signal when said focus servo control unit has conducted the focus servo pull-in, and determining success or failure of focus servo pull-in, wherein a successful focus servo pull-in is determined if the level change of said focus error signal is an expected value which corresponds to an amount of level change which occurs when such predetermined offset is inserted in said focus error signal.

2. Optical memory apparatus claimed in claim 1, wherein said focus servo pull-in determining unit removes the offset inserted after determination of focus servo pull-in.

3. Optical memory apparatus claimed in claim 1, wherein said focus servo pull-in determining unit compares an integral value of the focus error signal before insertion of said offset and after pull-in of focus servo with an integral value of focus error signal after insertion of offset, in order to detect level change of focus error signals.

4. Optical memory apparatus claimed in claim 1, wherein said focus servo pull-in determining unit compares (i) the center value of the positive and negative maximum values of a value obtained by sampling the focus error signal, for a plurality of times, (ii) the focus error signal before insertion of said offset after pull-in of the focus servo with the center value of the positive and negative maximum values of the value obtained by sampling, for a plurality of times, and (iii) the focus error signal after insertion of said offset, in order to detect level change of the focus error signal.

5. Optical memory apparatus claimed in claim 1, wherein said focus servo pull-in determining unit compares (i) the level, after passing a low-pass filter, of the focus error signal before insertion of said offset after pull-in of the focus servo with (ii) the level, after passing the low-pass filter, of the focus error signal after insertion of said offset, in order to detect level change of the focus error signal.

6. Optical memory apparatus claimed in claim 1, wherein said focus servo pull-in determining unit detects that the result of adding the level of focus error signal after insertion of said offset to the inserted offset value becomes zero.

7. Optical memory apparatus claimed in claim 1, wherein said offset is given by step-by-step addition or subtraction.

8. Optical memory apparatus claimed in claim 1, wherein when said offset is inserted, offset is once inserted to any one of the positive or negative sides for success of determination and thereafter offset is then inserted in the opposite polarity to make the second check.

9. A focus servo control method to maintain a relative positional relationship between a detected body and an optical spot, comprising at least the steps of:
    detecting a focus error signal indicating the relative positional relationship between said detecting body and said optical spot;
    inserting a predetermined offset to said focus error signal; and
    detecting level change of said focus error signal where said predetermined offset is inserted to said focus error signal when focus servo pull-in is conducted to determine success or failure of the focus servo pull-in,
    wherein a successful focus servo pull-in is determined if the level change of said focus error signal is an expected value which corresponds to an amount of level change which occurs when such predetermined offset is inserted in said focus error signal.

10. The focus servo control method of claim 9, further comprising the step of removing the offset inserted after determination of focus servo pull-in.

11. The focus servo control method of claim 9, further comprising of the step of comparing (i) an integral value of focus error signal before insertion of said offset after pull-in of focus servo with (ii) an integral value of focus error signal after insertion of offset, in order to detect level change of focus error signals.

12. The focus servo control method of claim 9, further comprising of the step of comparing (i) the center value of the positive and negative maximum values of the value obtained by sampling, for a plurality of times, the focus error signal before insertion of said offset after pull-in of the focus servo, with (ii) the center value of the positive and negative maximum values of the value obtained by sampling, for a plurality of times, the focus error signal after insertion of said offset, in order to detect level change of the focus error signal.

13. The focus servo control method of claim 9, further comprising the step of (i) comparing the level, after passing a low-pass filter, of the focus error signal before insertion of said offset after pull-in of the focus servo, with (ii) the level, after passing the low-pass filter, of the focus error signal after insertion of said offset, in order to detect level change of the focus error signal.

14. The focus servo control method of claim 9, further comprising of the step of detecting that the result of adding the level of focus error signal after insertion of said offset to the inserted offset value becomes zero.

15. The focus servo control method of claim 9, wherein said offset is given by step-by-step addition or subtraction.

16. The focus servo control method of claim 15, wherein said amount of addition is reduced each time the number of times of retry of focus servo pull-in is increased.

17. The focus servo control method of claim 15, wherein a waiting time after insertion of said amount of addition becomes longer each time the number of times of retry of focus servo pull-in increases.

18. The focus servo control method of claim 9, wherein when said offset is inserted, offset is first inserted to any one of the positive or negative sides for success of determination, and thereafter offset is inserted in the opposite polarity to make a second check.

19. Optical memory apparatus for conducting focus servo control to maintain constant relative positional relationship between a memory medium and an optical spot, comprising:
    a focus actuator for moving said optical spot relative to said memory medium;
    a driving unit for driving said focus actuator;
    a focus detecting unit for detecting a focus error signal indicating relative positional relationship between said memory medium and said optical spot;.
    a focus servo control unit for driving said driving unit based on the focus error signal detected from said focus detecting unit in order to move said focus actuator;
    an offset inserting unit for inserting a predetermined offset to said focus error signal; and
    a focus servo pull-in determining unit for detecting level change of said focus error signal when said focus servo control unit has conducted the focus servo pull-in, and determining success or failure of focus servo pull-in; and
    wherein said focus servo pull-in determining unit compares an integral value of the focus error signal before insertion of said offset and after pull-in of focus servo with an integral value of focus error signal after insertion of offset, in order to detect level change of focus error signals.

20. Optical memory apparatus for conducting focus servo control to maintain constant relative positional relationship between a memory medium and an optical spot, comprising:
    a focus actuator for moving said optical spot relative to said memory medium;
    a driving unit for driving said focus actuator;
    a focus detecting unit for detecting a focus error signal indicating relative positional relationship between said memory medium and said optical spot;
    a focus servo control unit for driving said driving unit based on the focus error signal detected from said focus detecting unit in order to move said focus actuator;
    an offset inserting unit for inserting a predetermined offset to said focus error signal;
    a focus servo pull-in determining unit for detecting level change of said focus error signal when said focus servo control unit has conducted the focus servo pull-in, and determining success or failure of focus servo pull-in; and
    wherein said focus servo pull-in determining unit compares (i) the center value of the positive and negative maximum values of a value obtained by sampling the focus error signal, for a plurality of times, (ii) the focus error signal before insertion of said offset after pull-in of the focus servo with the center value of the positive and negative maximum values of the value obtained by sampling, for a plurality of times, and (iii) the focus error signal after insertion of said offset, in order to detect level change of the focus error signal.

21. Optical memory apparatus for conducting focus servo control to maintain constant relative positional relationship between a memory medium and an optical spot, comprising:
    a focus actuator for moving said optical spot relative to said memory medium;

a driving unit for driving said focus actuator;

a focus detecting unit for detecting a focus error signal indicating relative positional relationship between said memory medium and said optical spot;

a focus servo control unit for driving said driving unit based on the focus error signal detected from said focus detecting unit in order to move said focus actuator;

an offset inserting unit for inserting a predetermined offset to said focus error signal;

a focus.servo pull-in determining unit for detecting level change of said focus error signal when said focus servo control unit has conducted the focus servo pull-in, and determining success or failure of focus servo pull-in; and wherein said focus servo pull-in determining unit compares (i) the level, after passing a low-pass filter, of the focus error signal before insertion of said offset after pull-in of the focus servo with (ii) the level, after passing the low-pass filter, of the focus error signal after insertion of said offset, in order to detect level change of the focus error signal.

22. Optical memory apparatus for conducting focus servo control to maintain constant relative positional relationship between a memory medium and an optical spot, comprising:

a focus actuator for moving said optical spot relative to said memory medium;

a driving unit for driving said focus actuator;

a focus detecting unit for detecting a focus error signal indicating relative positional relationship between said memory medium and said optical spot;

a focus servo control unit for driving said driving unit based on the focus error signal detected from said focus detecting unit in order to move said focus actuator;

an offset inserting unit for inserting a predetermined offset to said focus error signal;

a focus servo pull-in determining unit for detecting level change of said focus error signal when said focus servo control unit has conducted the focus servo pull-in, and determining success or failure of focus servo pull-in; and wherein said focus servo pull-in determining unit detects that the result of adding the level of focus error signal after insertion of said offset to the inserted offset value becomes zero.

23. Optical memory apparatus for conducting focus servo control to maintain constant relative positional relationship between a memory medium and an optical spot, comprising:

a focus actuator for moving said optical spot relative to said memory medium;

a driving unit for driving said focus actuator;

a focus detecting unit for detecting a focus error signal indicating relative positional relationship between said memory medium and said optical spot;

a focus servo control unit for driving said driving unit based on the focus error signal detected from said focus detecting unit in order to move said focus actuator;

an offset inserting unit for inserting a predetermined offset to said focus error signal;

a focus servo pull-in determining unit for detecting level change of said focus error signal when said focus servo control unit has conducted the focus servo pull-in, and determining success or failure of focus servo pull-in; and wherein said offset is given by step-by-step addition or subtraction.

24. Optical memory apparatus claimed in claim 23, wherein said amount of addition is reduced each time the number of times of retry of focus servo pull-in is increased.

25. Optical memory apparatus claimed in claim 23, wherein a waiting time after insertion of said amount of addition becomes longer each time the number of times of retry of focus servo pull-in increases.

26. Optical memory apparatus for conducting focus servo control to maintain constant relative positional relationship between a memory medium and an optical spot, comprising:

a focus actuator for moving said optical spot relative to said memory medium;

a driving unit for driving said focus actuator;

a focus detecting unit for detecting a focus error signal indicating relative positional relationship between said memory medium and said optical spot;

a focus servo control unit for driving said driving unit based on the focus error signal detected from said focus detecting unit in order to move said focus actuator;

an offset inserting unit for inserting a predetermined offset to said focus error signal;

a focus servo pull-in determining unit for detecting level change of said focus error signal when said focus servo control unit has conducted the focus servo pull-in, and determining success or failure of focus servo pull-in; and wherein when said offset is inserted, offset is once inserted to any one of the positive or negative sides for success of determination and thereafter offset is then inserted in the opposite polarity to make the second check.

27. A focus servo control method to maintain a relative positional relationship between a detected body and an optical spot, comprising at least the steps of:

detecting a focus error signal indicating the relative positional relationship between said detecting body and said optical spot;

inserting a predetermined offset to said focus error signal;

detecting level change of said focus error signal when focus servo pull-in is conducted to determine success or failure of the focus servo pull-in; and comparing (i) an integral value of focus error signal before insertion of said offset after pull-in of focus servo with (ii) an integral value of focus error signal after insertion of offset, in order to detect level change of focus error signals.

28. A focus servo control method to maintain a relative positional relationship between a detected body and an optical spot, comprising at least the steps of:

detecting a focus error signal indicating the relative positional relationship between said detecting body and said optical spot;

inserting a predetermined offset to said focus error signal;

detecting level change of said focus error signal when focus servo pull-in is conducted to determine success or failure of the focus servo pull-in; and comparing (i) the center value of the positive and negative maximum values of the value obtained by sampling, for a plurality of times, the focus error signal before insertion of said offset after pull-in of the focus servo, with (ii) the center value of the positive and negative maximum values of the value obtained by sampling, for a plurality of times, the focus error signal after insertion of said offset, in order to detect level change of the focus error signal.

29. A focus servo control method to maintain a relative positional relationship between a detected body and an optical spot, comprising at least the steps of:

detecting a focus error signal indicating the relative positional relationship between said detecting body and said optical spot;

inserting a predetermined offset to said focus error signal;

detecting level change of said focus error signal when focus servo pull-in is conducted to determine success or failure of the focus servo pull-in; and     comparing (i) the level, after passing a low-pass filter, of the focus error signal before insertion of said offset after pull-in of the focus servo, with (ii) the level, after passing the low-pass filter, of the focus error signal after insertion of said offset, in order to detect level change of the focus error signal.

30. A focus servo control method to maintain a relative positional relationship between a detected body and an optical spot, comprising at least the steps of:

detecting a focus error signal indicating the relative positional relationship between said detecting body and said optical spot;

inserting a predetermined offset to said focus error signal;

detecting level change of said focus error signal when focus servo pull-in is conducted to determine success or failure of the focus servo pull-in; and     detecting that the result of adding the level of focus error signal after insertion of said offset to the inserted offset value becomes zero.

31. A focus servo control method to maintain a relative positional relationship between a detected body and an optical spot, comprising at least the steps of:

detecting a focus error signal indicating the relative positional relationship between said detecting body and said optical spot;

inserting a predetermined offset to said focus error signal;

detecting level change of said focus error signal when focus servo pull-in is conducted to determine success or failure of the focus servo pull-in; and     wherein said offset is given by step-by-step addition or subtraction.

32. A focus servo control method to maintain a relative positional relationship between a detected body and an optical spot, comprising at least the steps of:

detecting a focus error signal indicating the relative positional relationship between said detecting body and said optical spot;

inserting a predetermined offset to said focus error signal;

detecting level change of said focus error signal when focus servo pull-in is conducted to determine success or failure of the focus servo pull-in; and     wherein when said offset is inserted, offset is first inserted to any one of the positive or negative sides for success of determination, and thereafter offset is inserted in the opposite polarity to make a second check.

\* \* \* \* \*